United States Patent [19]

Williams, IV et al.

[11] 4,221,530
[45] Sep. 9, 1980

[54] FORCE-MOMENT COMPENSATING APPARATUS

[76] Inventors: James M. Williams, IV; James M. Williams, V, both of 503 W. Hillwood Dr., Nashville, Tenn. 37205

[21] Appl. No.: 913,824

[22] Filed: Jun. 8, 1978

[51] Int. Cl.² .............................................. B66F 9/22
[52] U.S. Cl. ................................. 414/673; 180/285; 180/290; 187/9 R; 414/674
[58] Field of Search ............... 187/9 R; 414/673, 719, 414/674; 212/48, 49; 280/755; 180/282, 285, 284, 290

[56] References Cited

U.S. PATENT DOCUMENTS

| | | | |
|---|---|---|---|
| 2,759,563 | 8/1956 | Marnon et al. | 212/49 X |
| 2,935,161 | 5/1960 | Comfort | 187/9 R |
| 3,734,326 | 5/1973 | Esser | 414/673 X |
| 3,993,166 | 11/1976 | Senour | 414/674 X |
| 4,068,773 | 1/1978 | Downing | 414/674 X |

*Primary Examiner*—Robert G. Sheridan
*Attorney, Agent, or Firm*—Harrington A. Lackey

[57] ABSTRACT

A force-moment compensating apparatus, particularly adapted for use with load handling apparatus, including stabilizing means, sensing means for sensing a change in value of a force-moment acting on the apparatus, and actuator means responsive to the sensing means for restoring the force-moments acting on the apparatus to a stable condition.

9 Claims, 6 Drawing Figures

FORCE-MOMENT COMPENSATING APPARATUS

BACKGROUND OF THE INVENTION

This invention relates to a force-moment compensating apparatus, and more particularly to a load compensating apparatus.

Heretofore, in load handling apparatus and vehicles, such as forklift trucks, cranes, lifts, hoists and other types of load handling apparatus in which the force-moments, including the weight and/or position of the load, change, fixed centers of gravity and counterweights are designed into the original vehicles. Accordingly, the weight or position of loads handled by such vehicles are limited by the original design of the vehicle.

SUMMARY OF THE INVENTION

It is therefore an object of this invention to provide in an apparatus subjected to changes in force-moments, such as a vehicle or load handling apparatus, stabilizing means for shifting the force-moments acting on the apparatus in response to the weight or position of a load handled by the apparatus or vehicle, or to the centrifugal force, inertia, or other forms of force-moments subject to change in the apparatus.

More specifically, the force-moment compensating apparatus may include a pressure transducer adapted to sense the value of the weight of a load on a static or mobile frame, and a counterweight mounted on the frame for shiftable movement in response to a sensed weight change, in order to vary the center of gravity of the frame. An actuator means or control apparatus is responsive to the signal from the sensing means to cause the counterweight to move to a different position commensurate with the value of the sensed signal. Such actuator means or control apparatus are preferably electrical or electronic.

The force-moment compensator apparatus, made in accordance with this invention, is also adapted to sense the position of a load, such as the translatory position and/or the angular position of the load relative to the vehicle. Independent signals from either the translatory sensor or the angular sensor may energize a control apparatus either independently or in combination to shift the counterweight or to change the speed of the vehicle.

For example, in a forklift truck having a tiltable mast supporting a hoist mechanism for raising and lowering load-supporting forks, the weight of the load may be sensed by a pressure transducer sensor, the position of the load may be sensed by position sensors. The signals developed by these respective sensors are processed by the electrical control apparatus for shifting the counterweight on the vehicle by a commensurate amount to change the center of gravity of the vehicle and/or to vary the speed of the vehicle, so that the vehicle operates under a safe speed for the value or position of the load it is handling or carrying.

DESCRIPTION OF THE PREFERRED EMBODIMENTS

Figure 1:
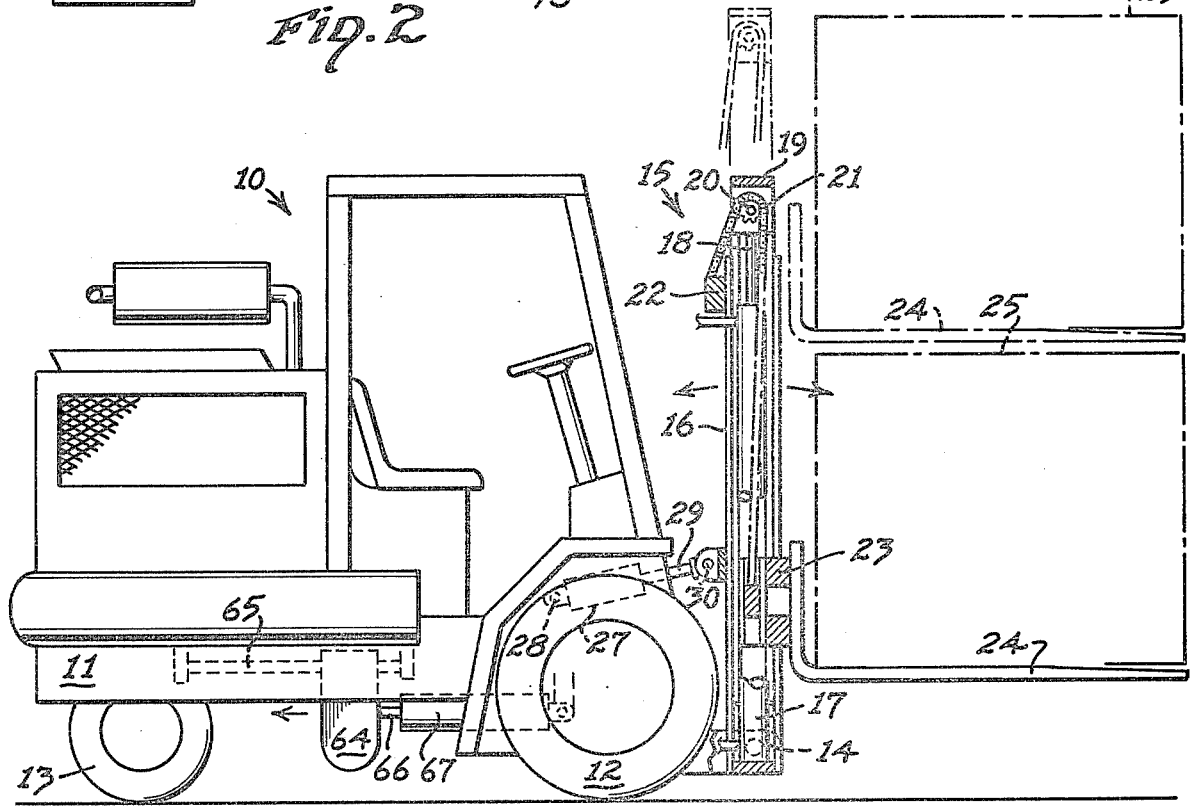
FIG. 1 is a side elevation of a forklift truck incorporating the force-moment compensating apparatus made in accordance with this invention.

Referring now to the drawings in more detail, FIG. 1 discloses, as an example of a load handling apparatus or vehicle, a forklift truck 10 including a frame 11 supported by front wheels 12 and rear wheels 13.

Pivotally mounted upon the front end of the frame 11 by a journal pin 14 is the forklift mechanism 15. The forklift mechanism 15 includes a mast 16 supporting hydraulic cylinder 17 telescopically receiving a piston rod 18 for vertical reciprocal movement. Fixed to the top of the piston rod 18 is a transverse yoke 18 supporting sprockets 20, over which are trained the lift chains 21. The rear end of the lift chains 21 are fixed to the transverse beam 22 of the mast 16, while the opposite ends of the chains 21 are fixed to the fork frame 23 from which project forwardly the lift forks 24. The forks 24 are adapted to support and carry a load 25.

The mast 16 may be pivoted or tilted about the journal pin 14 by a hydraulic tilt cylinder 27 journalled by pin 28 to the frame 11, and reciprocally supporting the piston rod 29 journalled by pin 30 to mast 16.

The forklift truck 10 is preferably driven by a prime mover, such as the electrical motor 32 (FIG. 2), which drives a pump shaft 33 for operating the variable-volume pump 34 and the fixed rate pump 35.

Variable-volume pump 34 circulates hydraulic fluid in either direction through the hydraulic line 36, relief valve 37 and back through the return line 38 to the variable pump 34. Such flow occurs when relief valve 37 is in static position. When the pump 34 is shifted to forward position, hydraulic fluid flows in the direction of the arrows disclosed in FIG. 2 through the forward input lines 39, 40 and 41, respectively, to the left and right front wheel hydraulic motors 43 and 44. Fluid from the wheel motors 43 and 44 returns through the lines 45, 46 and 47 to the relief valve 37. By reversing the direction of the pump 34, flow through the lines 39, 40, 41, 45, 46 and 47 is reversed, to reverse the direction of the vehicle or forklift truck 10. By controlling the pump 34, the wheel motors 43 and 44 may be driven at the same speed forward, the same speed rearward, or at different speeds in order to turn the vehicle to the left or right. The speed of the vehicle may be controlled by varying the speed of the variable-volume pump 34, such as by the speed control positioning device 50, which is adapted to be electrically energized. The variable-volume pump 34 may be any of several conventional types, such as a swash-plate pump.

The fixed rate pump 35 pumps hydraulic fluid from the reservoir 52 through lines 53 and 54 to the mast-controlled 4-way valve 55. When the mast control valve 55 is in its "raise" position, hydraulic fluid flows through the hydraulic line 56 to the mast cylinder 17.

Hydraulic fluid also flows from line 54 through the mast control valve 55 and through line 57 to the tilt control valve 58, also a manually controlled 4-way valve. When the tilt control valve 58 is in its forward position, hydraulic fluid flows through the tilt feed line 59 to one end of the tilt cylinder 27, while the return fluid from the other end of the tilt cylinder 27 passes through the return line 60, tilt control valve 58, and return line 61 to the reservoir 52.

Thus, the load 25 may be raised and lowered by the forks 24 in response to the manual operation of the mast control valve 55, while the mast 16 may be tilted by operation of the tilt control valve 58.

The force-moment compensator apparatus made in accordance with this invention includes a counterweight 64 mounted for movement on the frame 11 of the forklift truck 10, such as in the longitudinal, front-to-rear direction along a slide bar or track 65.

The counterweight 64 may be moved along the slide bar or track 65 by means of a piston rod 66 reciprocally movable within a hydraulic cylinder 67. Flow of the hydraulic fluid into the actuator cylinder 67 is controlled by a spool valve 68, disclosed in its neutral position in FIG. 3. By energization of the extension solenoid 69, the spool valve 68 is shifted to the right (FIG. 3) to cause hydraulic fluid from the line 61 to pass through the line 71 into the rear end of the cylinder 67 thereby projecting the piston rod 66 forward, to extend the counterweight 64 along the slide rod 65. Fluid from the cylinder 67 passes through the forward line 72 back through the spool valve 68 to the return line 62 into the reservoir 52.

Figure 2:
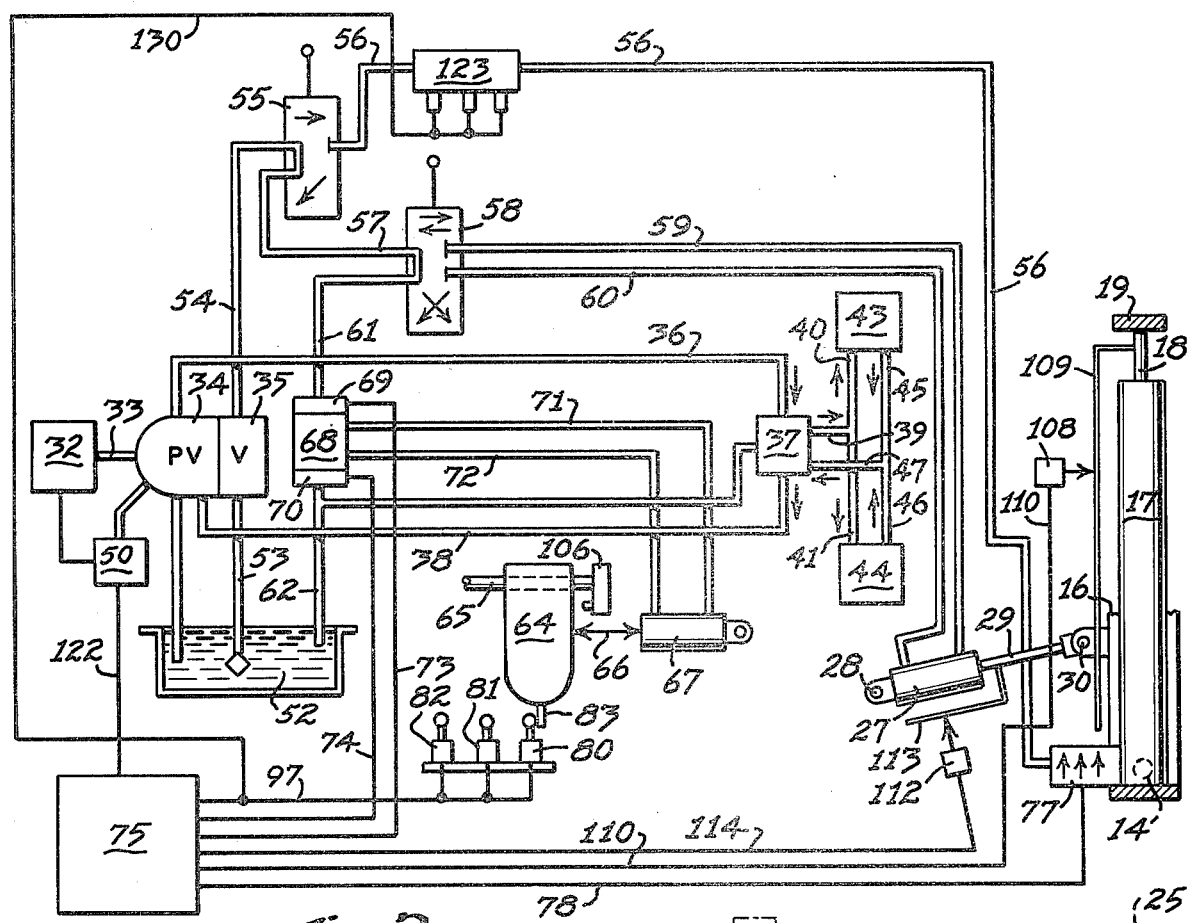
FIG. 2 is a schematic hydraulic-electric circuit diagram of the force-moment compensating apparatus incorporated in the forklift truck of FIG. 1.

The extension solenoid 69 and the return solenoid 70 are energized through their respective electrical lines 73 and 74 from the electronic control circuit device 75 (FIG. 2).

Figure 3:
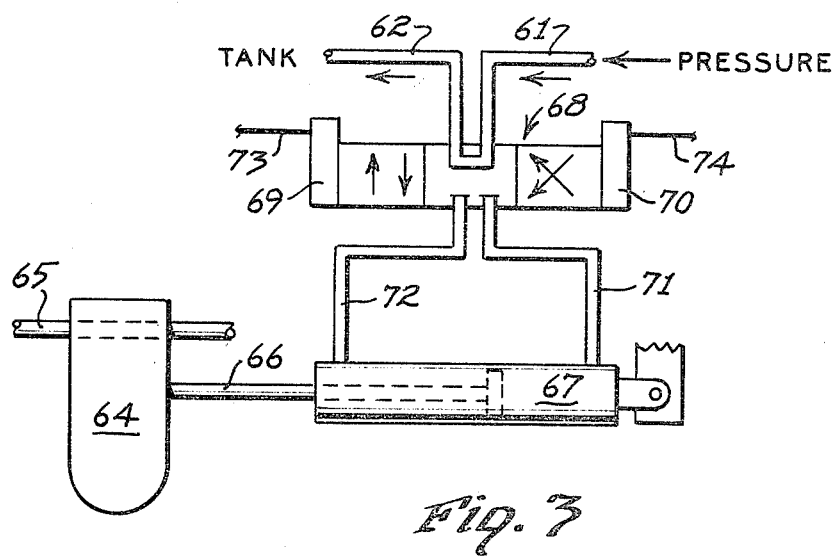
FIG. 3 is an enlarged schematic diagram of the hydraulic circuit for controlling the counterweight.

When the return solenoid 70 is energized, the spool valve 68 is shifted to the left of FIG. 3, to reverse the direction of the flow of hydraulic fluid from the line 61 to the line 72 in order to retract the piston rod 66 and counterweight 64.

The extent of travel of the counterweight 64 along the track 65, or the position to which the counterweight 64 is moved, is controlled by a sensing device, in the form of the pressure transducer 77, mounted in fluid communication with the base of the hydraulic lift cylinder 17, or other lift-type device. Thus, the pressure of the hydraulic fluid within the cylinder 17, which in turn is determined by the weight of the load 25 upon the forks 24, determines the value of the electrical signal transmitted from the pressure transducer 77 through the input line 78 to the electric control circuit 75. The signal from the input line 78 is processed in the control circuit 75 to arm or condition one of the spaced limit switches 80, 81 or 82, or a variable transducer, for engagement by the actuator 83 to sense the position of the counterweight 64. Thus, when the counterweight 64 arrives at the desired position to counterbalance the sensed weight of the load 25, it will actuate the particular limit switch, such as limit switch 81, or variable transducer, which in turn will energize the control circuit 75 to de-energize the extension solenoid 69 and stop the counterweight in the desired safe position.

Figure 4:
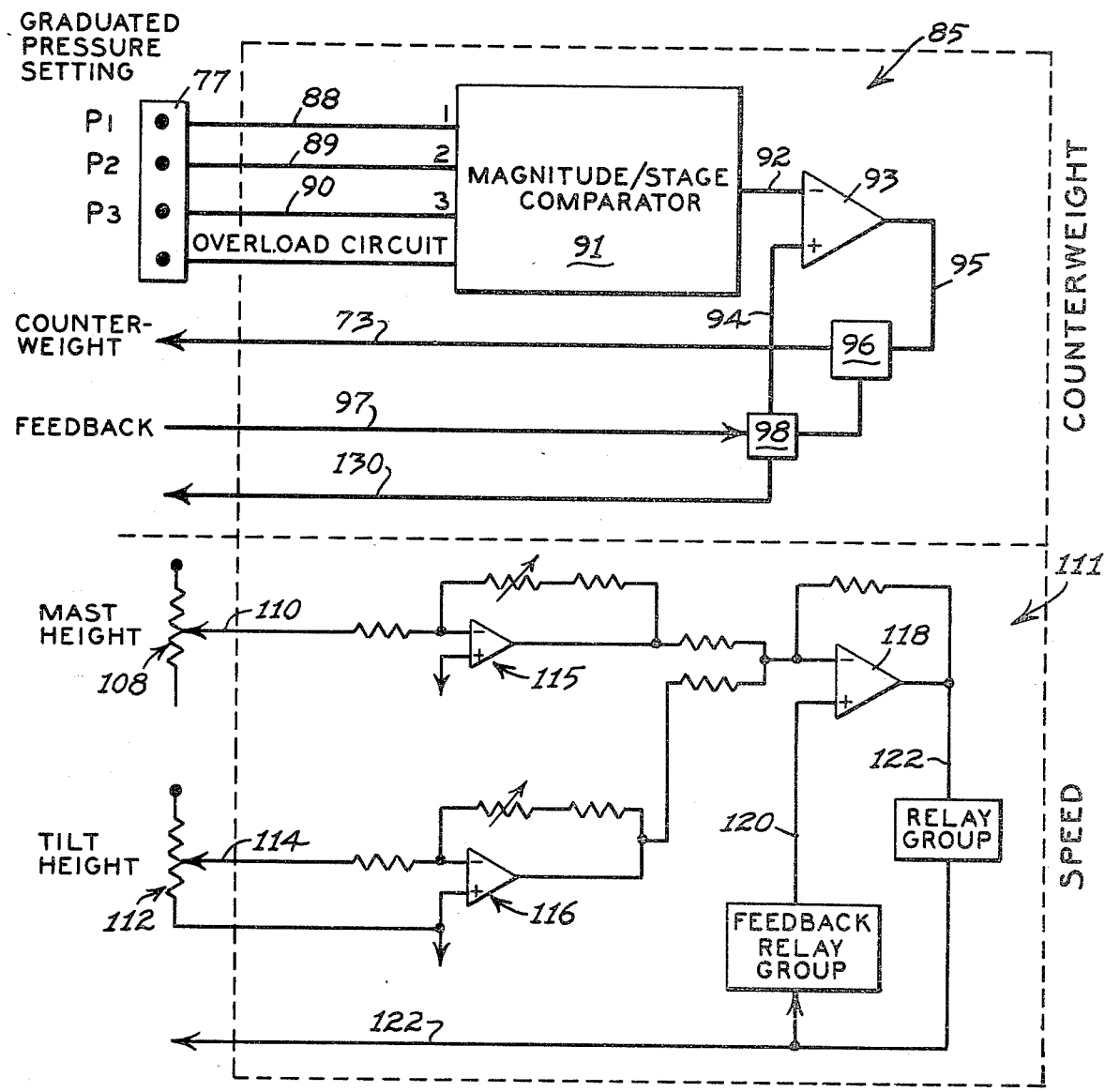
FIG. 4 is an electrical circuit diagram of the electrical control circuit disclosed in FIG. 2.

The counterweight circuit 85 within the control circuit 75 for controlling the position of the counterweight 64 is disclosed in the upper portion of FIG. 4.

The pressure transducer 77 includes a plurality of graduated pressure threshold settings, P1, P2 and P3, or it may be a variable sensing transducer (FIG. 4). For example, a low-pressure signal from the transducer 77 (FIG. 4) will be admitted through the input lead 88 for P1, (FIG. 4), whereas no signals will be transmitted through leads 89 and 90. The input signal passing through the input lead 88 will be processed in the comparator circuit 91 to produce an amplified output signal transmitted through output line 92 to the integrated amplifier 93. The input signal passing through the input line 92 will be compared, or integrated, in the integrated amplifier 93 with a feedback signal transmitted from the line 94. The resultant output signal in the line 95 energizes the counterweight positioning control 96, which transmits a signal through the line 73 to the extension solenoid 69.

The feedback signal transmitted to the integrated amplifier 93 through the line 94 originates in one of the limit switches 80, 81 or 82 (or variable transducer). The generated feedback signals are transmitted through the feedback line 97 to a relay circuit 98 in order to provide a reference signal to indicate in the circuit 85 the actual position of the counterweight 64 at any particular moment. Thus, when the summation of the feedback signal and the input signal from line 92 in the integrated amplifier 93 produce a resultant null or zero signal in the output circuit 95, then the extension solenoid 69 will be de-energized and the spool valve 68 returned to its neutral position to stop the counterweight 64 at the desired position corresponding to the pressure signal generated by the transducer 77.

Figure 5:
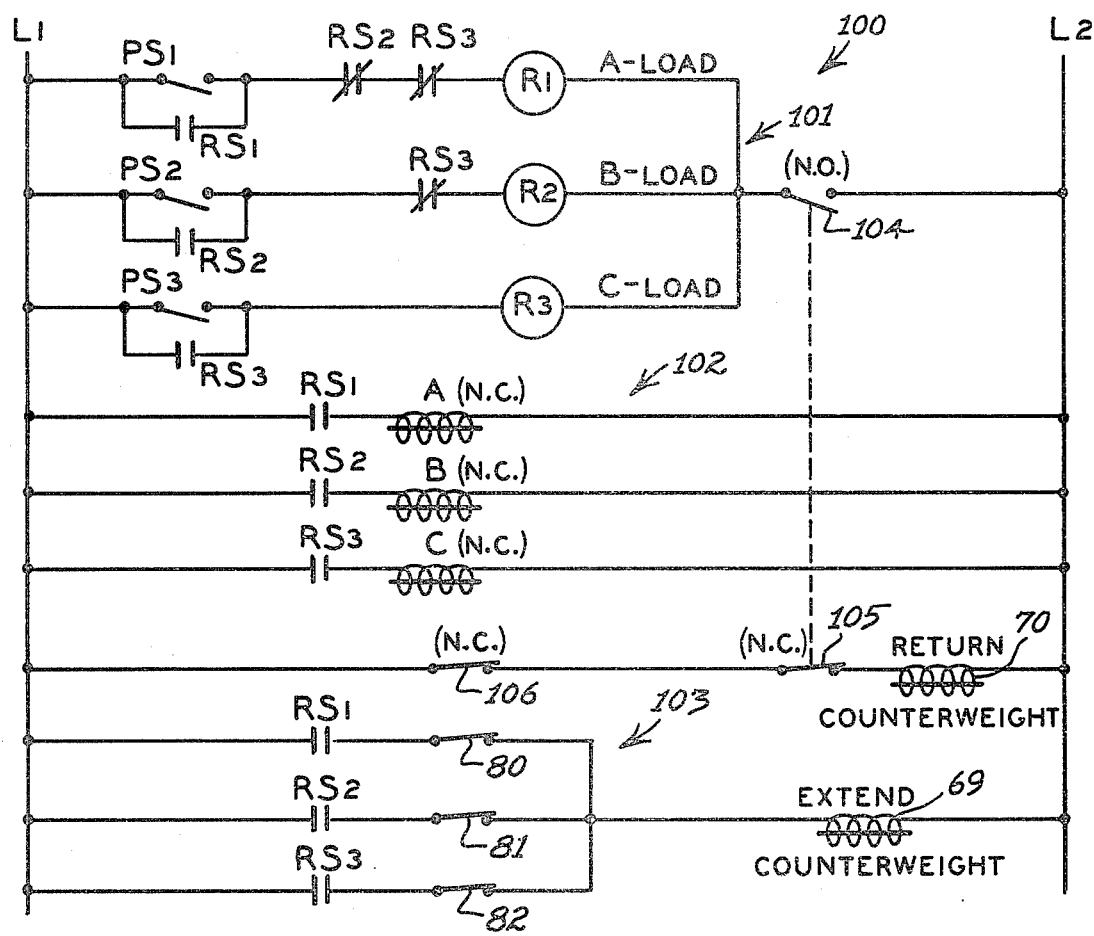
FIG. 5 is an electrical circuit diagram of a modified form of electrical control circuit for the counterweight.

In lieu of the electronic counterweight circuit 85, the magnetic relay circuit 100, disclosed in FIG. 5, could be employed. The terms PS1, PS2 and PS3 indicate the respective pressure switches which are actuated respectively at increasing intervals of pressure sensed by transducer 77. The three relay coils are designated R1, R2 and R3. The relay coil R1, when energized, closes the respective relay switches RS1, in each of the pressure sensing circuit 101, the overload circuit 102 and the counterweight circuit 103.

In like manner, when the relay coil R2 is energized, the normally closed relay switches RS2 are opened, while the normally open relay switches RS2 are closed. The relay coil R3 controls the relay switches RS3 in the same manner.

Therefore, if a low-pressure signal is detected to close the pressure switch PS1, the relay coil R1 is energized, while the relay coils R2 and R3 are de-energized. The relay switch RS1 across the pressure switch PS1 is closed to hold the circuit 101, controlled by the relay coil R1, energized. The overload safety circuit 102 controlled by the switch RS1 is closed, and the counterweight circuit 103 including the relay switch RS1 is also closed to energize the extension relay coil 69 causing the counterweight 64 to travel toward the left in FIG. 2. When the actuator arm 83 engages the limit switch 80, the limit switch is opened to de-energize the counterweight coil 69 and stop the counterweight 64 in its first position.

The same operation is effected for successively higher pressures to successively energize relay coils R2 and then R3.

When the load 25 is removed from the forklift, or when it is no longer desired to operate the forklift truck 10, or for any reason, the switch 104 may be opened, simultaneously closing the switch 105 to energize the return counterweight coil 70 and restore the counterweight 64 to its original position. When the counterweight 64 returns to its original position, it engages and opens limit switch 106 to de-energize the return solenoid 70.

A translatory sensor 108, preferably in the form of a rotary potentiometer, is mounted in a fixed position relative to the mast 16. Fixed to the piston rod 18 is an elongated bracket arm or track against which the rotary member of the rotary potentiometer 108 is adapted to travel. Thus, as the piston rod 18 rises relative to the hydraulic lift cylinder 17, the rotary potentiometer or translatory sensor 108 produces an electrical signal of a value or voltage proportionate or commensurate with the vertical distance traveled by the arm 109, and therefore the piston rod 18 and the load 25. The translatory signal is transmitted from the translatory sensor 108 through lead 110 to the control circuit 75.

In like manner, an angular sensor 112, also preferably in the form of a rotary potentiometer having its rotary member adapted to roll on the elongated bracket or track 113 fixed to the tilt piston rod 29, produces a signal commensurate with, or proportional to, the tilt angle of the mast 16, which is transmitted through the lead 114 to the control circuit 75.

As best disclosed in the lower portion of the circuit diagram of FIG. 4, the translatory signal transmitted through the input line 110, and the angular signal transmitted through the line 114, are amplified by the respective amplifier circuits 115 and 116. The resultant output signals are integrated in the amplifier 118 and compared with the feedback signal received through the line 120. The resultant signal from the integrated amplifier 118 is transmitted through the output lead 122 to energize the speed-control device 50, thereby actuating the variable pump 34 to adjust the flow of hydraulic fluid, and consequently the speed of the vehicle 10 commensurate with the signals generated by the translatory sensor 108 and the angular sensor 112.

Figure 6:
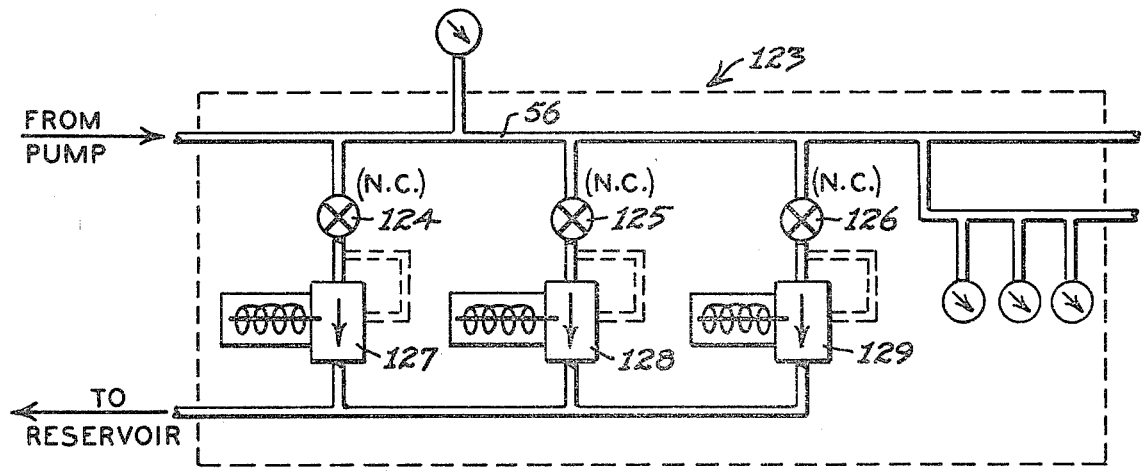
FIG. 6 is a hydraulic-electric diagram of the overload safety system disclosed in FIG. 2.

Connected in the mast feed circuit 56 is an overload safety device 123 including three solenoid valves 124, 125 and 126, all connected in parallel, and each adapted to be energized at the same time that a corresponding limit switch 80, 81 or 82 is actuated. Thus, when the counterweight 64 is at position 1, as disclosed in FIG. 2, that is when the actuator 83 is actuating the first limit switch 80, then the solenoid valve 124 is opened to activate the overload switch 127 (FIG. 6). While the counterweight 64 is in its first position and the hydraulic circuitry, particularly in the mast feed line 56 has its pressure suddenly rise, the excess pressure will be dumped through the solenoid valve 124 (FIG. 6) and overload valve 127 back to the reservoir. The valves 125, 128 and 126, 129 function in the same manner for overload safety when the counterweight 64 is loaded in its second and third positions, respectively.

The circuit 102 in FIG. 5 has the same function as the circuit 123 in FIG. 6.

The counterweight control circuit 85, disclosed in FIG. 4 is connected to the overload safety circuit 123 by the lead 130.

The operation of the force-moment compensator apparatus when specifically applied to a load-handling apparatus or vehicle, such as forklift truck 10, is as follows:

The operator of the forklift truck 10 starts the prime mover 32 to commence the circulation of hydraulic fluid via the variable-volume pump 34 through the hydraulic fluid lines 36 and 38 to drive the respective wheel motors 43 and 44 in order to propel the vehicle 10 in the desired direction, and at the desired speed. Simultaneously, the fixed rate pump 35 provides hydraulic fluid through lines 54 and 57 to the mast control valve 55 and the tilt control valve 58.

In order to lift a load 25, forks 24 are lowered to their load-engaging position by manipulation of the handle on the mast control valve 55. The vehicle 10 is then propelled forward to insert the forks 24 beneath the load 25, and the mast control valve 55 is manipulated to lift the forks 24, and therefore the load 25, to the desired elevation, such as the elevation disclosed in phantom in FIG. 1. The load 25 may be tilted rearward by manipulating the tilt control valve 58.

The pressure sensor 77 then senses the pressure within the mast cylinder 17, which is commensurate with the weight of the load 25, and sends a corresponding signal to the control circuit 75 for processing, such as by the counterweight control circuit 85 of FIG. 4. If the sensed load is within its limits, that is, less than its predetermined threshold value, the counterweight 64 does not move. If the threshold value is exceeded, the extended solenoid 64 is energized to actuate the spool valve 68. Spool valve 68 is then manipulated to actuate the counterweight cylinder 67 to extend the counterweight 64 to a predetermined position, such as the position disclosed in FIG. 2 in which the actuator 83 engages and actuates the limit switch 80. The feedback signal generated by the limit switch 80 is then fed to the control circuit 85 in order to stop the movement of the counterweight 64 in its desired position, properly counterbalancing the weight and position of the load 25 resting upon the forks 24 to provide a predetermined safe center of gravity for the forklift truck 15 which will adequately stabilize the vehicle during its movement.

If the load 25 is raised to an excessive elevation, signals from the translatory sensor 108 and the tilt sensor 112 will be transmitted to the speed control circuit 111 where the desired output signal will be produced and transmitted through the line 122 to the speed control device 50 to actuate the variable-volume pump 34 in order to reduce the speed of the vehicle 10 to a safe speed for movement of the vehicle 10 with the load 25 in its particular elevated and angular position.

The overload safety circuits 123 or 102 will effectively dump hydraulic fluid back to the reservoir 52 should the mast feed line 56 encounter any sudden or excessively high fluid pressures.

When the angle of tilt of the load 25 is changed by the actuation of the tilt cylinder 27 through the tilt control valve 58, or the load 25 is lowered by lowering the forks 24, then the signals generated by the translatory sensor 108 and the tilt sensor 112 will be processed in the speed control circuit 111 to produce a corresponding resultant signal in the line 122 for ultimately increasing, or otherwise changing the maximum or travel speed of the vehicle 10.

Loads 25 having weights of different values will develop corresponding signals of different values in the pressure transducer 77 for varying the position of the counterweight 64 to properly counterbalance the load 25 in the vehicle 10 to appropriately maintain the center of gravity of the vehicle 10 between the wheels 12 and 13 for safety.

Thus, the stability of the vehicle 10 will always be maintained regardless of the value or position of the load 25 handled by the forks 24.

The same circuits and components can be adapted and applied to other types of vehicles and other types of load handling apparatus in which the center of gravity or other forces or force-moments are apt to change by virtue of the weights and positions of the loads handled by load handling apparatus, or by virtue of changes in movement of vehicles, such as changes in turning or directional movements creating centrifugal forces.

What is claimed is:

1. In a mobile load-handling apparatus having a frame subjected to changes in moments of force, a force-moment compensating apparatus comprising:
   (a) motive means for moving said frame,
   (b) speed-changing means for varying the speed of said motive means, in response to an electrical output signal,
   (c) a translatory sensor for sensing the translatory position of a load on said frame handled by said apparatus, and for producing a translatory signal commensurate with the sensed translatory position of said load,
   (d) an angular sensor for sensing the angular position of said load, and for producing an angular signal commensurate with the sensed angular position of said load, and
   (e) an electrical speed control circuit receiving and integrating said translatory signal and said angular signal to produce an output signal to actuate said speed-change means to vary the speed of said motive means commensurate with the value of said output signal.

2. The invention according to claim 1 in which said translatory sensor senses the change in the linear position of said load on said frame and produces said translatory signal proportionate to said change in linear position, and said angular sensor senses the change in angular position of said load and produces said angular signal proportionate to said change in said angular position, said electrical speed control circuit comprising integrator means for integrating said translatory and angular signals to produce said output signal.

3. The invention according to claim 2 in which said load-handling apparatus is a forklift truck having a frame and a mast pivoted upon said frame, a hoist mechanism supported on said mast, and load-supporting forks operatively connected to said hoist mechanism for raising and lowering said forks relative to said mast, tilt actuator means for pivoting said mast relative to said frame, said translatory sensor being mounted on said frame and cooperative with said hoist mechanism for sensing the change in height of said forks, and said angular sensor for sensing the change in angular position of said mast.

4. The invention according to claim 3 in which said hoist mechanism comprises an upright hydraulic cylinder supported on said mast, a piston rod telescopingly received in said hydraulic cylinder and operatively connected to said forks for raising and lowering said forks relative to said mast, said tilt actuator means comprising a hydraulic tilt cylinder operatively connected to said frame and reciprocably supporting a tilt piston rod journaled to said mast for pivoting said mast relative to said frame.

5. The invention according to claim 4 in which said translatory sensor and said angular sensor each comprises a rotary potentionmeter operatively connected to said corresponding piston rods for sensing the respective linear and angular positions of the load on said forks.

6. The invention according to claim 4 in which said motive means comprises hydraulic motive means including a variable-volume pump, said speed-change means comprising means for varying the volume of said variable-volume pump.

7. The invention according to claim 3 further comprising counterweight means movably mounted on said frame, load-sensing means comprising pressure transducer means for producing an electrical weight signal commensurate with the weight of the load on said forks, actuator means operatively connected to said counterweight means for moving said counterweight means to a predetermined position relative to said frame in response to an electrical control circuit responsive to said weight signal to produce said output signal for moving said counterweight means to a predetermined position commensurate with said weight signal.

8. The invention according to claim 1 further comprising counterweight means movably mounted on said frame, load sensing means adapted to sense the weight of said load, and actuator means operatively connected to said counterweight means for moving said counterweight means to a predetermined position relative to said frame in response to a signal from said load sensing means commensurate with the weight of said load.

9. The invention according to claim 8 in which said load-sensing means comprises pressure transducer means for producing an electrical weight signal commensurate with the weight of said load, said actuator means comprising an electrical control circuit responsive to said weight signal to shift said counterweight means to a predetermined position commensurate with said weight signal.

* * * * *